Sept. 5, 1939. E. W. MILLER 2,171,589
INVOLUTE MEASURING MACHINE
Filed Feb. 17, 1938 9 Sheets-Sheet 1

Inventor
Edward W. Miller
by Wright, Brown, Quinby & May
Attys.

Sept. 5, 1939. E. W. MILLER 2,171,589
INVOLUTE MEASURING MACHINE
Filed Feb. 17, 1938 9 Sheets-Sheet 2

Inventor
Edward W. Miller
by Wright, Brown, Quinby & May
Attys.

Sept. 5, 1939.　　　　E. W. MILLER　　　　2,171,589
INVOLUTE MEASURING MACHINE
Filed Feb. 17, 1938　　　　9 Sheets-Sheet 3

Inventor
Edward W. Miller
by Wright, Brown, Quinby & May
Attys.

Sept. 5, 1939.   E. W. MILLER   2,171,589
INVOLUTE MEASURING MACHINE
Filed Feb. 17, 1938   9 Sheets-Sheet 4
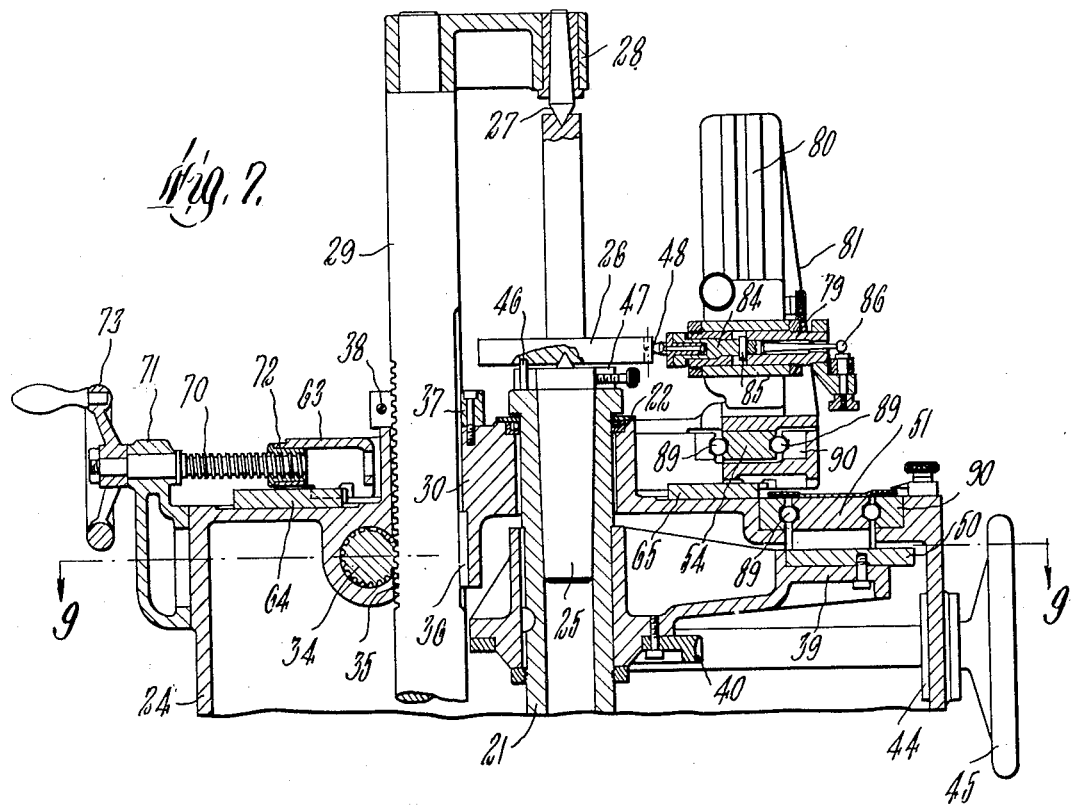
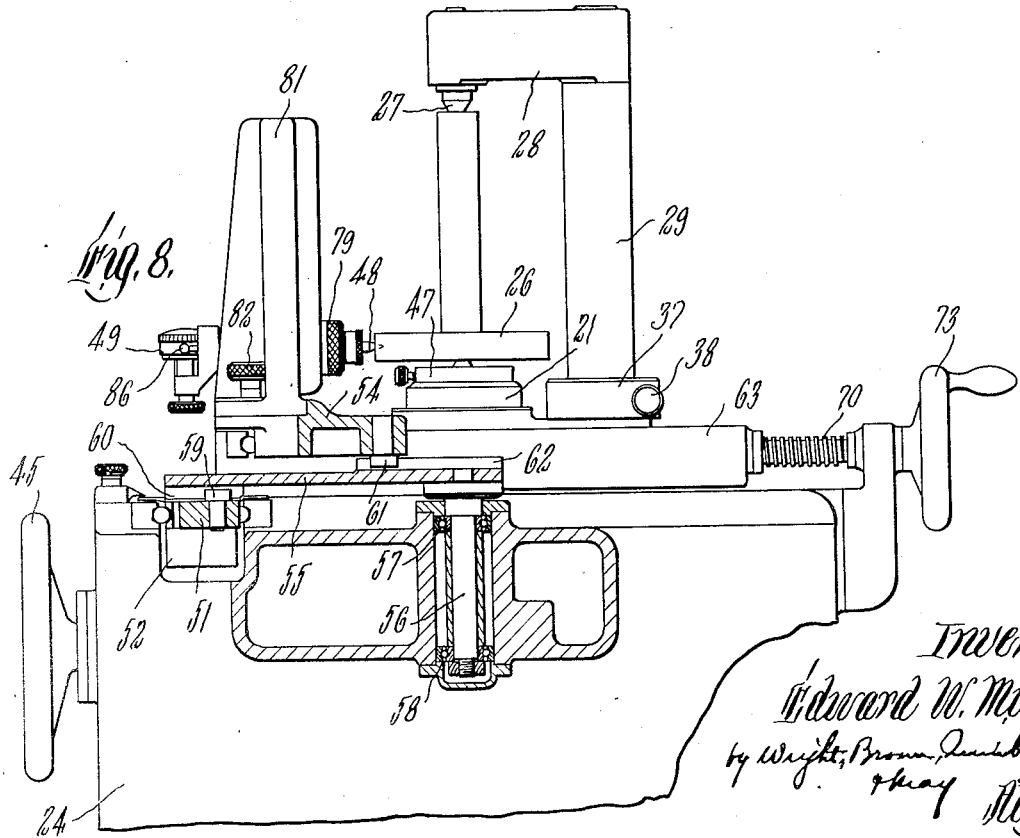
Inventor
Edward W. Miller
by Wright, Brown, Quinby
& May
Attys.

Sept. 5, 1939.  E. W. MILLER  2,171,589
INVOLUTE MEASURING MACHINE
Filed Feb. 17, 1938  9 Sheets-Sheet 5

Inventor
Edward W. Miller
by Wright, Brown, Quinby
& May
Attys.

Sept. 5, 1939.  E. W. MILLER  2,171,589
INVOLUTE MEASURING MACHINE
Filed Feb. 17, 1938    9 Sheets-Sheet 6

Sept. 5, 1939.  E. W. MILLER  2,171,589
INVOLUTE MEASURING MACHINE
Filed Feb. 17, 1938  9 Sheets-Sheet 7

Inventor
Edward W. Miller
by Wright, Brown, Quinby & Vray
Attys.

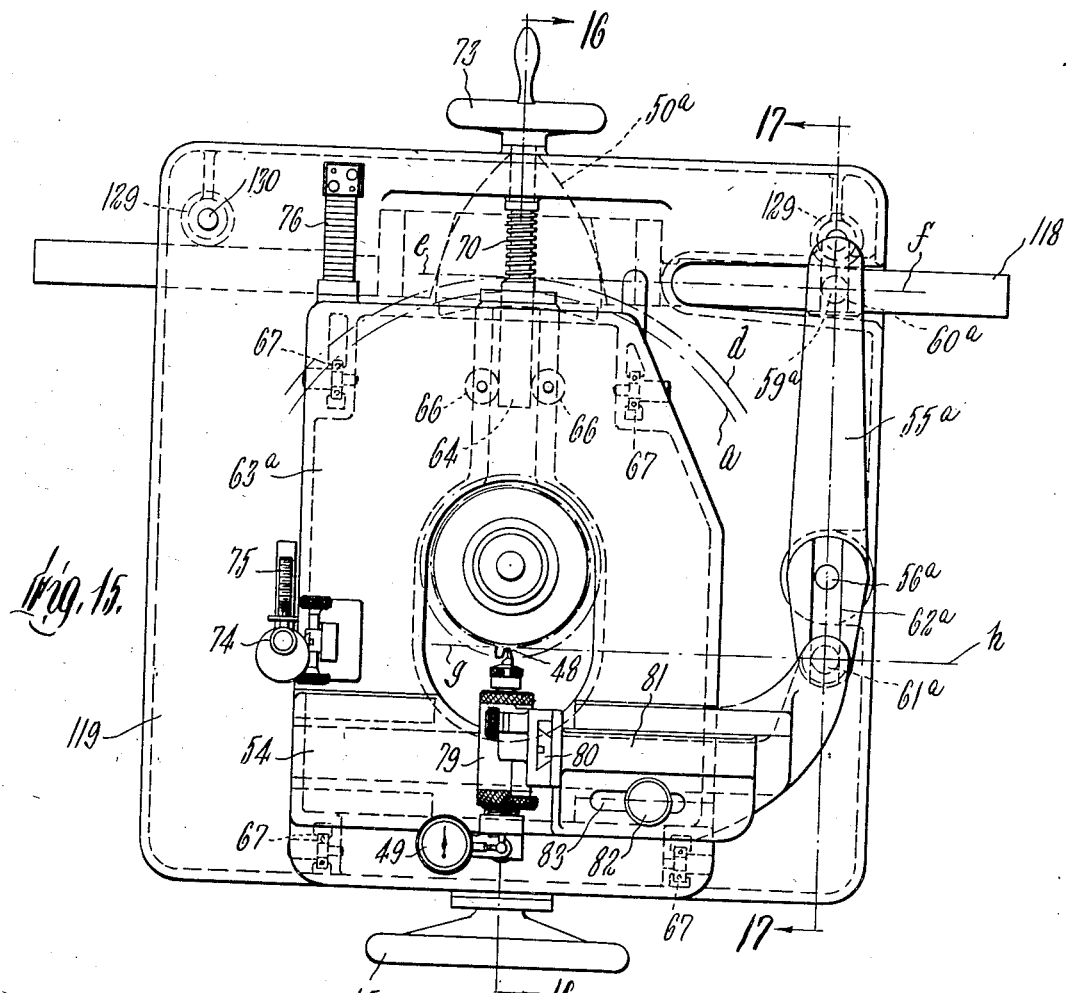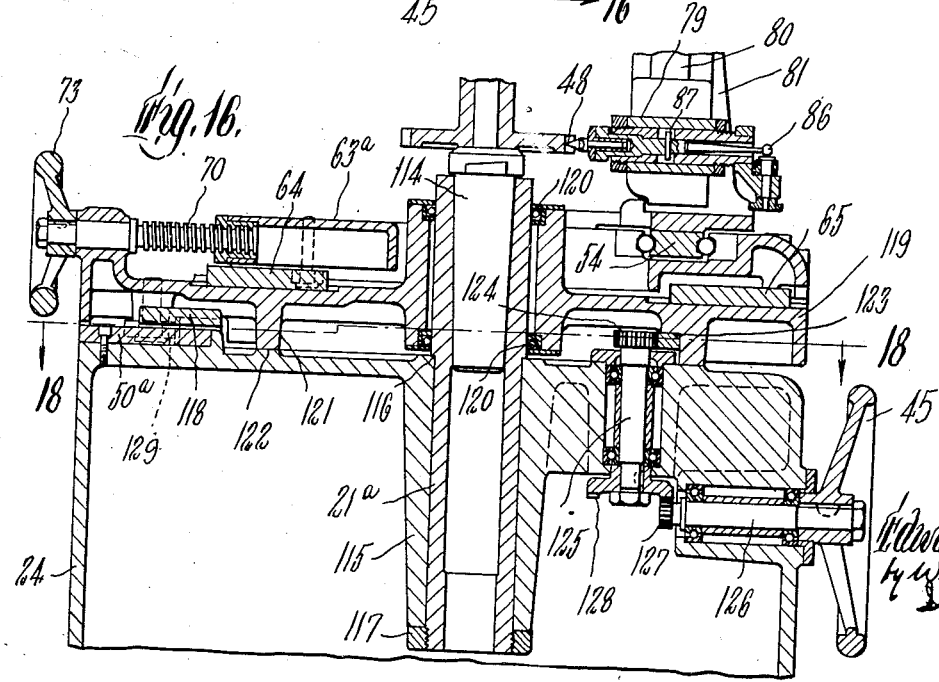

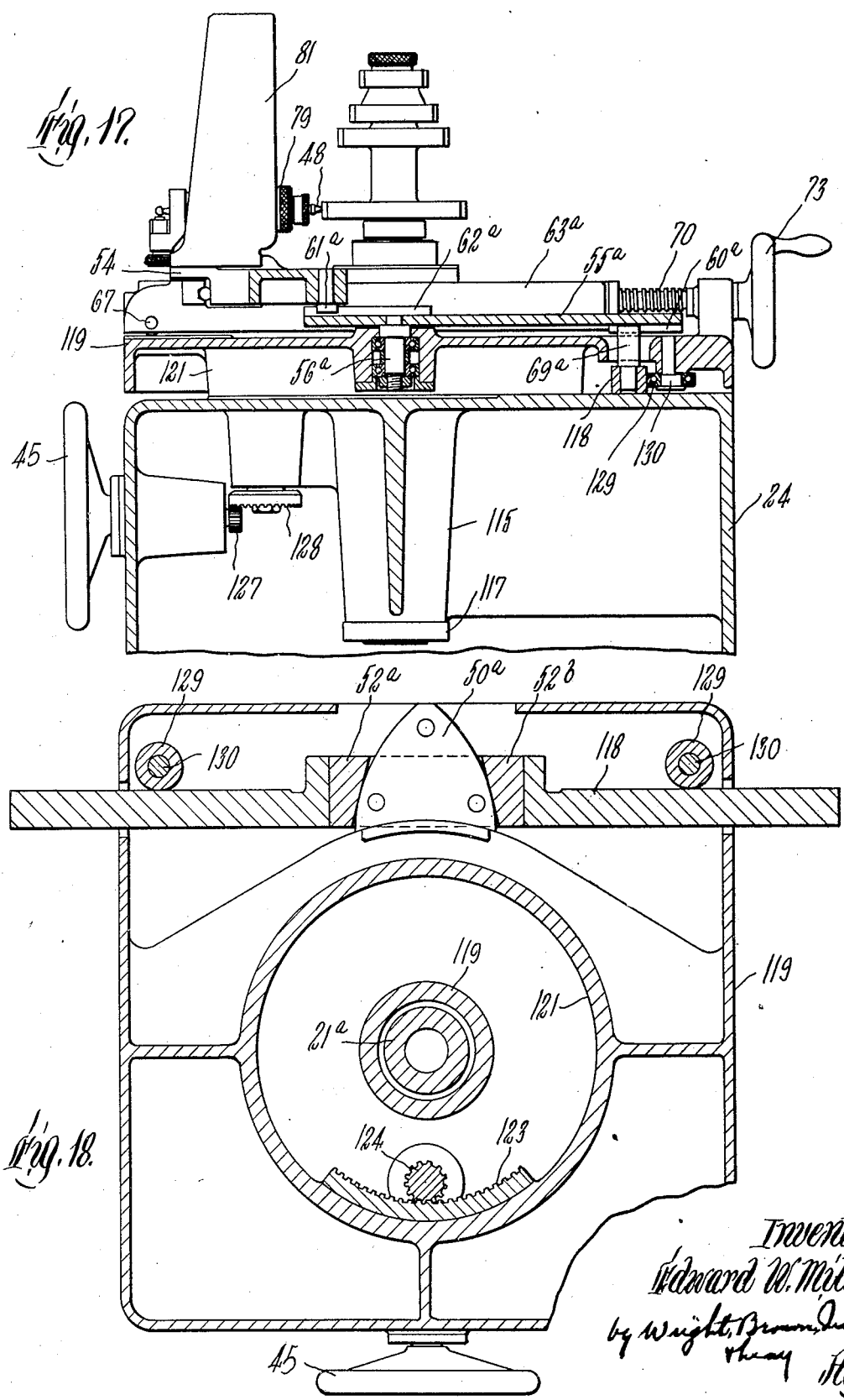

Patented Sept. 5, 1939

2,171,589

UNITED STATES PATENT OFFICE 2,171,589

INVOLUTE MEASURING MACHINE

Edward W. Miller, Springfield, Vt., assignor to The Fellows Gear Shaper Company, Springfield, Vt., a corporation of Vermont Application February 17, 1938, Serial No. 190,991

15 Claims. (Cl. 33—174)

The subject matter of the present invention is a machine for testing the accuracy of, and measuring errors in, certain curves, such as the tooth face curves of involute gears, gear shaper cutters and the like, but particularly of gears. Its principal object is to provide a testing machine of this character which, in the first place, is accurate in the highest degree and, in the second place, is adapted for use by manufacturers of gears, by reason of capacity for instant and accurate adjustment, to test gears of a wide variety of dimensions and types. A further part of the object has been to provide a precision instrument of this character which is of simple construction, positive in action in all adjustments, and one which can be furnished for the uses of industry at moderate cost.

The principles of the invention may be embodied in various forms, three of which are illustratively disclosed in the present specification. In all of them means are provided for producing a relative translation and rotation between a device which, for the purpose of this description I call a feeler, and the involute form to be tested, in which the relative translative motion takes place in a line tangent to the base circle of the involute form, together with a lever through which the translative movement is imparted to the feeler, and as to which the effective length of the lever arm operating the feeler may be altered to adjust the path, and extent of translative movement, of the feeler to accord with different base circles. These several illustrative embodiments will now be described, and their common principles explained, with reference to the accompanying drawings.

In the drawings—

Figure 1:
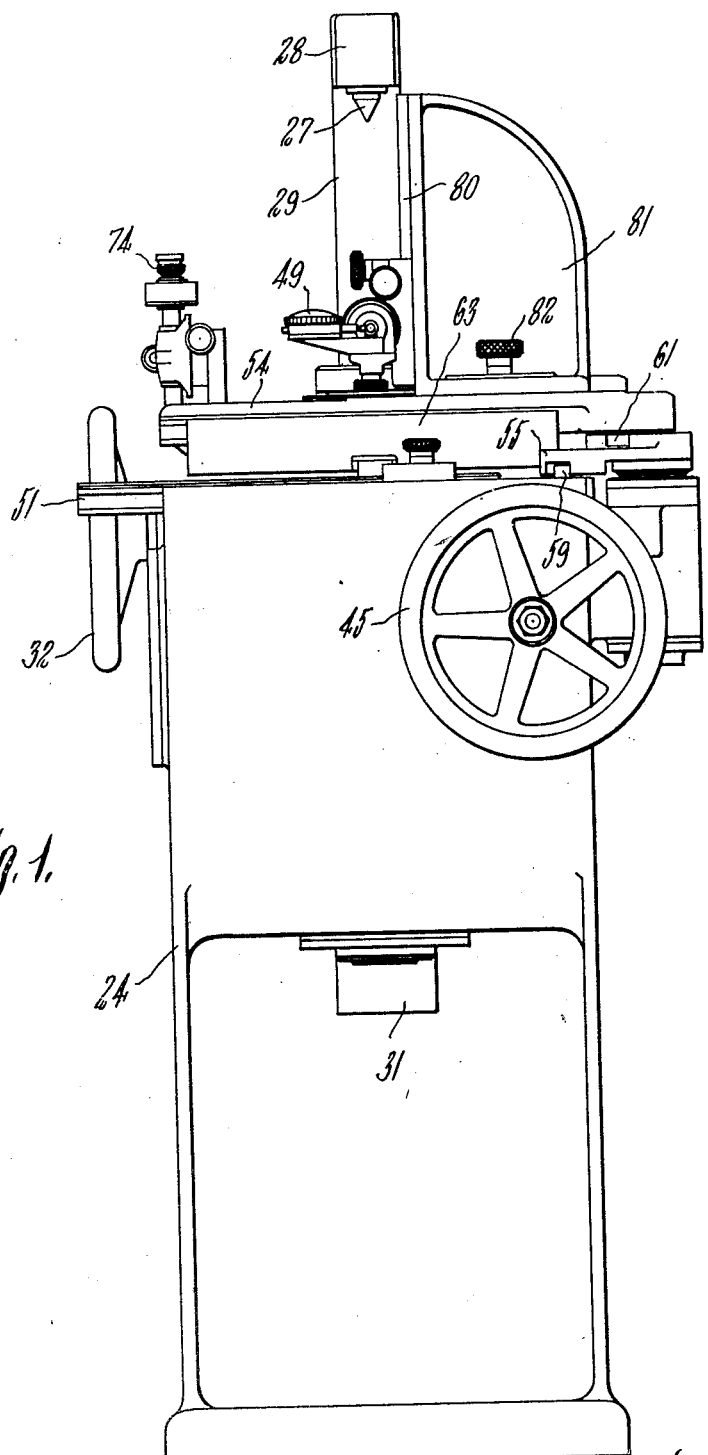
Fig. 1 is a front elevation of an involute measuring machine containing one embodiment of this invention.
Figure 2:
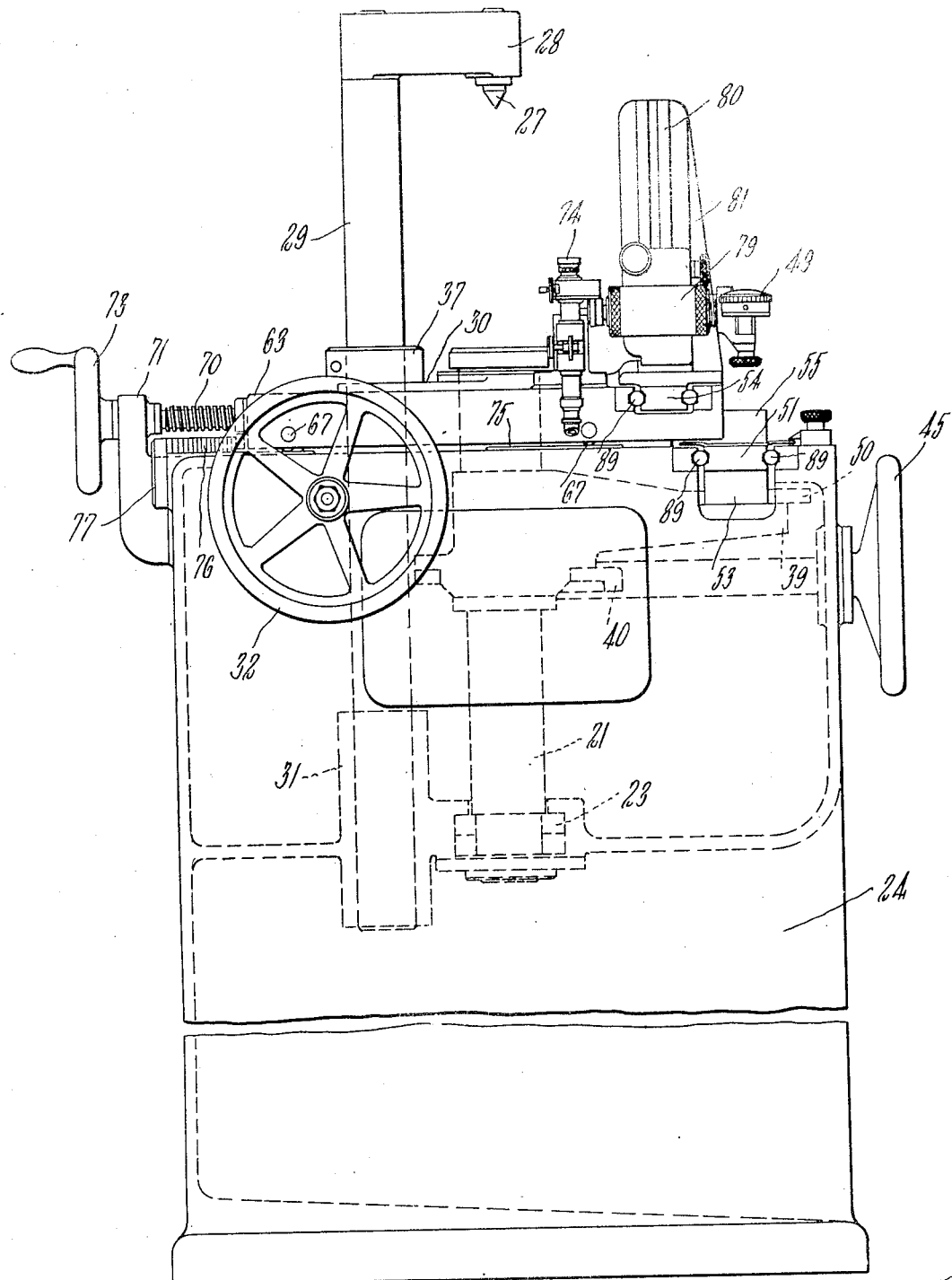
Fig. 2 is a side elevation of the machine.
Figure 3:
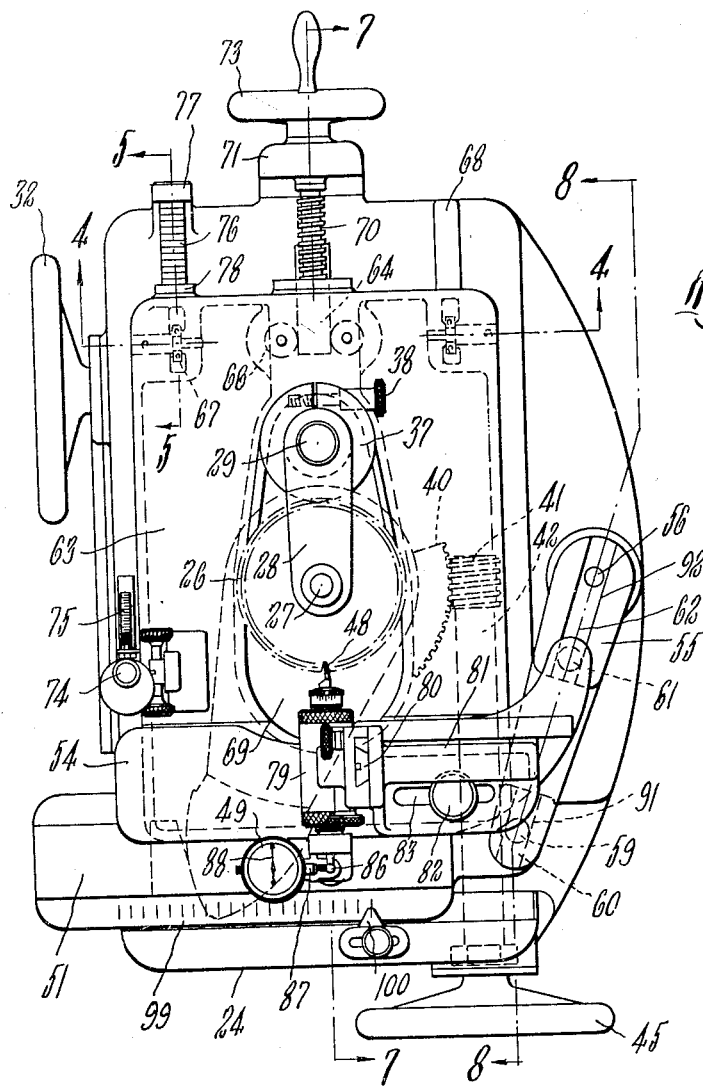
Fig. 3 is a plan view of the machine.
Figure 5:
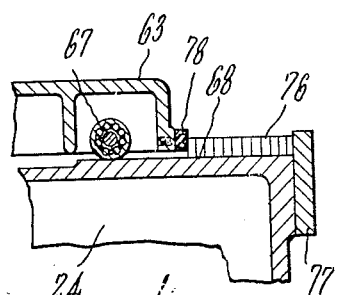
Figure 6:
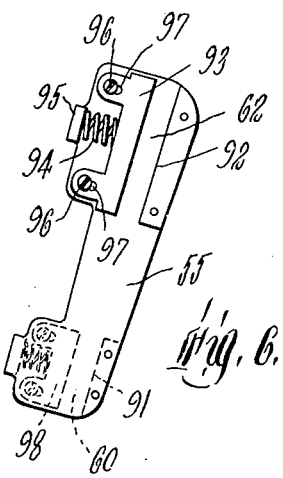
Figure 4:
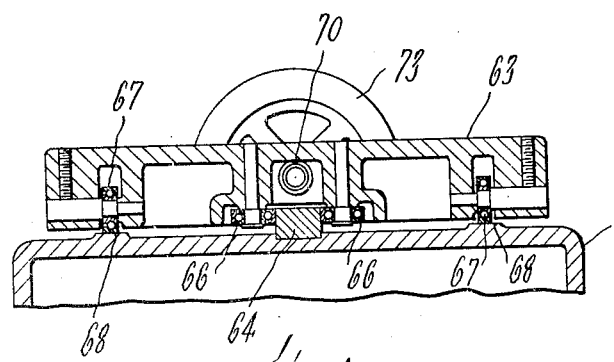
Figure 9:
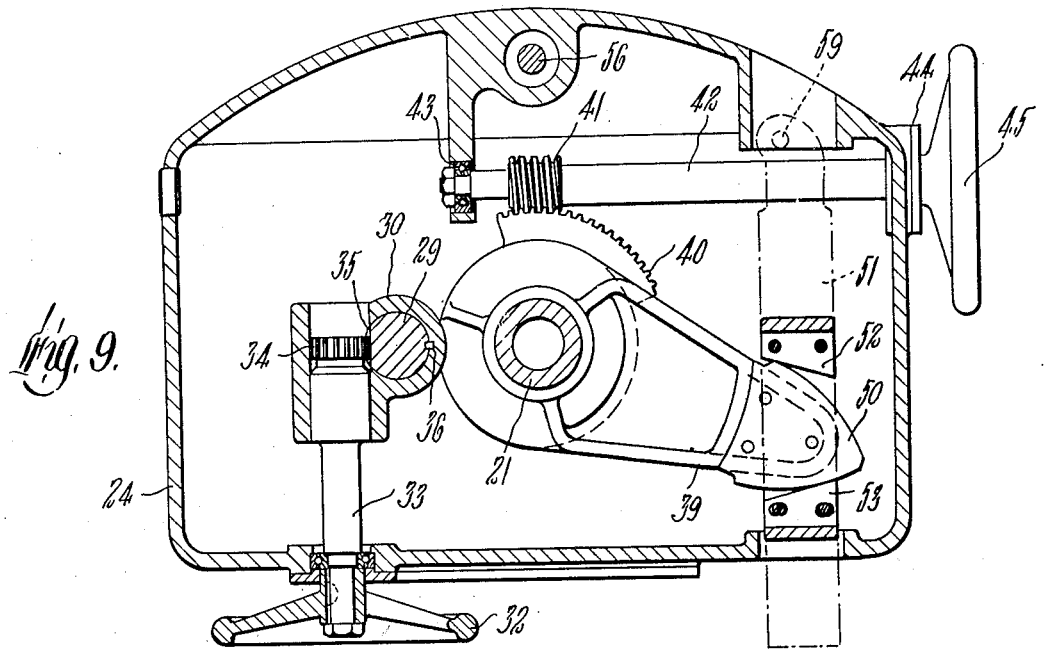
Figure 10:
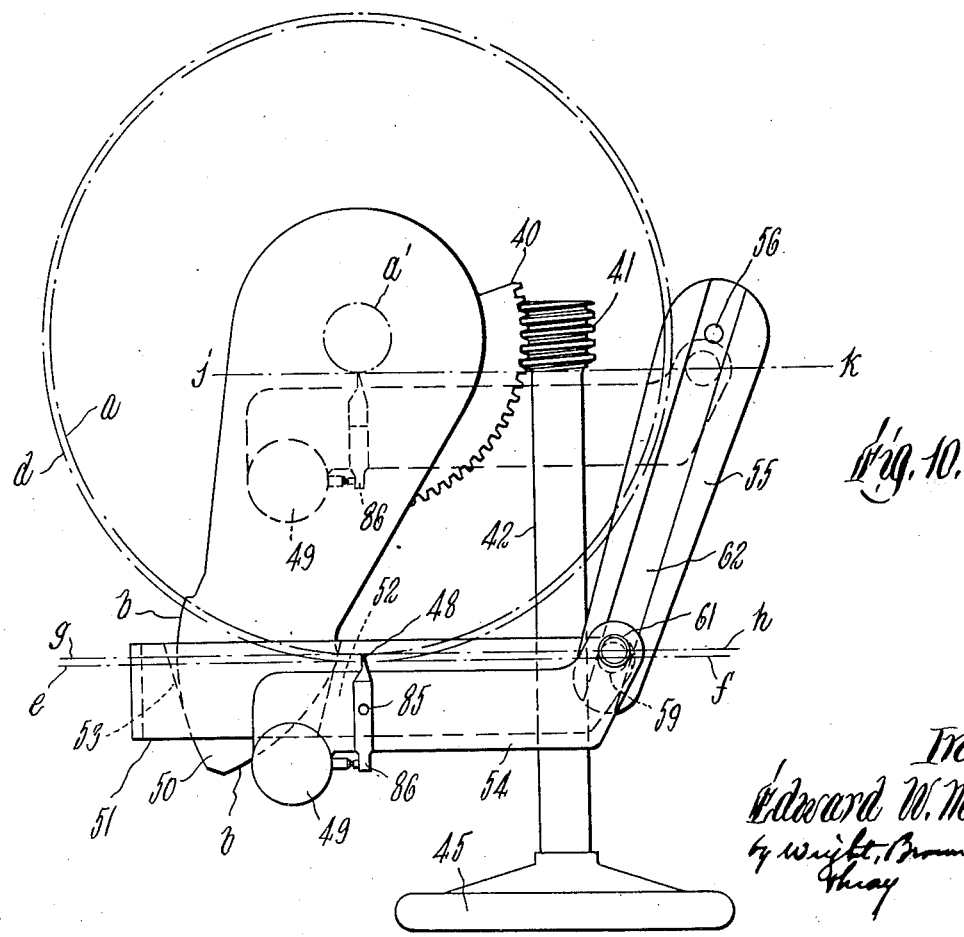
Figure 11:
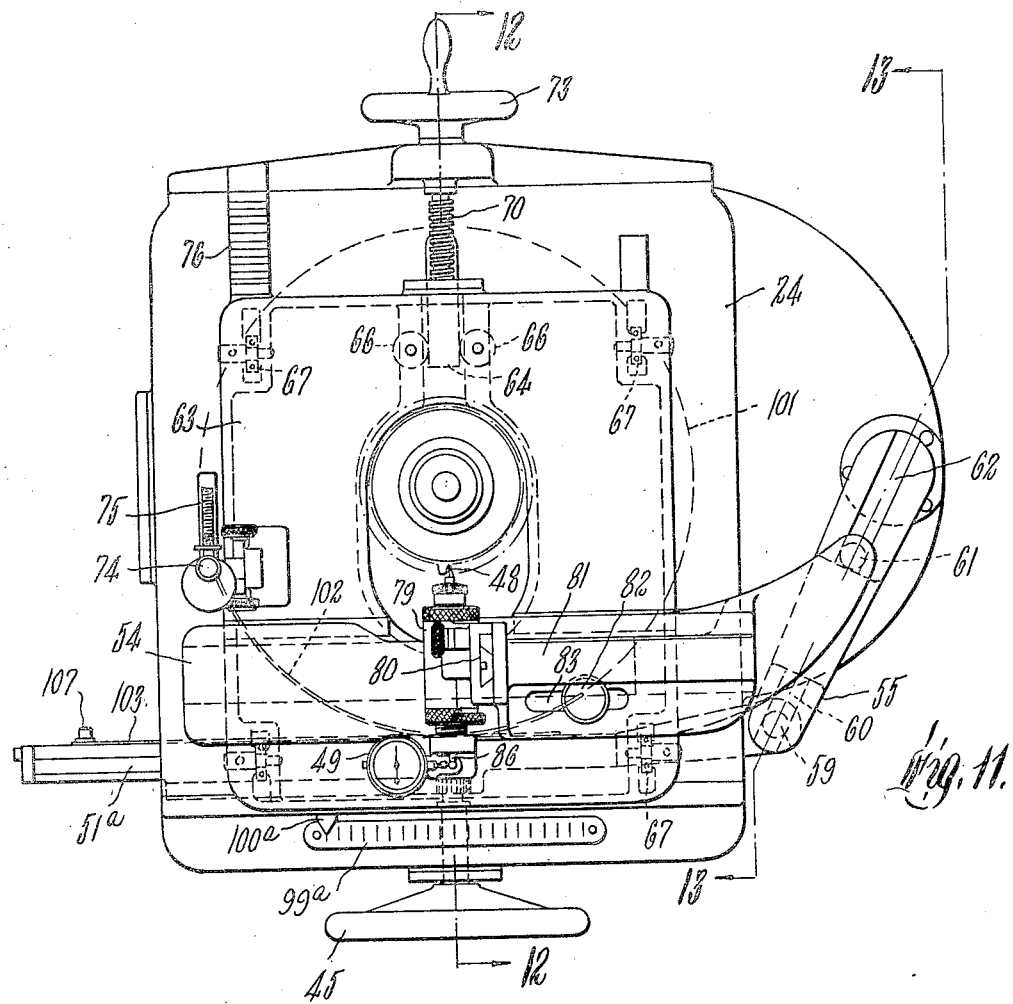
Figure 12:
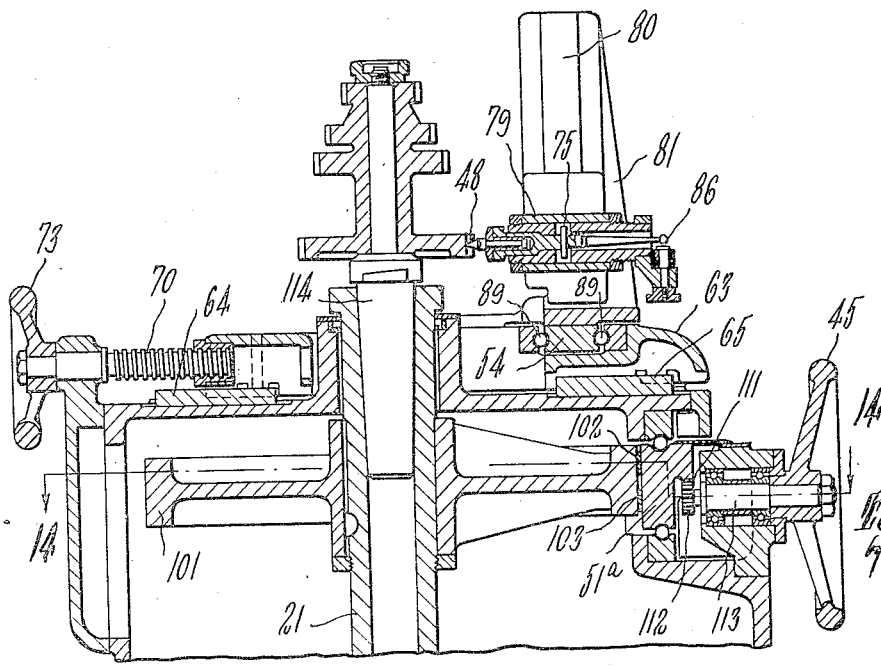
Figure 13:
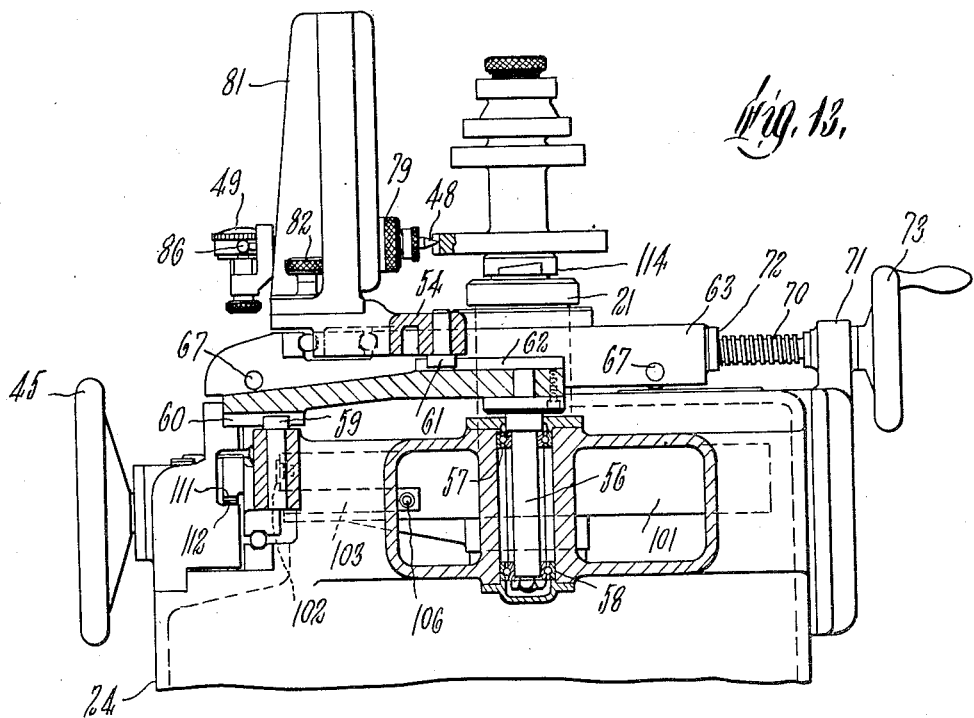
Figure 14:
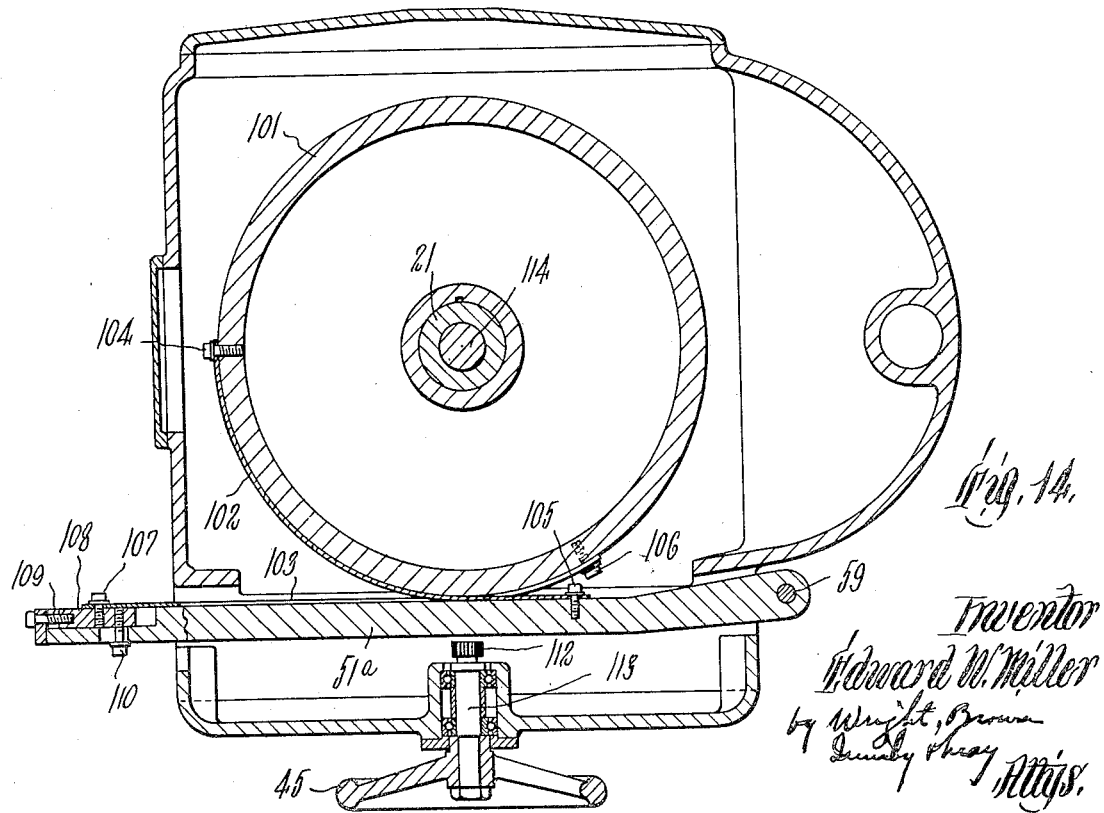

Figs. 4 and 5 are detail sectional views taken on lines 4—4 and 5—5 respectively of Fig. 3;

Fig. 6 is a plan view of one form of lever which constitutes an element of the adjustable motion transmitting means of the machine;

Figs. 7 and 8 are longitudinal sectional elevations taken on lines 7—7 and 8—8 respectively of Fig. 3;

Fig. 9 is a sectional plan view taken on line 9—9 of Fig. 7;

Fig. 10 is a diagrammatic plan view showing the principles of the means for moving the feeler and for adjusting its path and extent of movement to different base circles;

Fig. 11 is a plan view of another form of machine embodying the same generic invention;

Figs. 12 and 13 are sectional elevations of the latter machine taken on lines 12—12 and 13—13 respectively of Fig. 11;

Fig. 14 is a horizontal section of the same machine taken on line 14—14 of Fig. 12;

Fig. 15 is a plan view of a third form of machine embodying the invention;

Figs. 16 and 17 are sectional elevations taken on lines 16—16 and 17—17 respectively of Fig. 15;

Fig. 18 is a sectional plan view taken on line 18—18 of Fig. 16.

Like reference characters designate the same parts wherever they occur in all the figures.

Referring first to the form of the invention illustrated in Figs. 1-10 inclusive, a spindle 21 is mounted in bearings 22 and 23 in a base 24, which may be of any suitable structure and of dimensions suitable either for supporting the machine either on the floor or mounting it on a bench. The spindle has a tapered socket in its upper end to receive an arbor or center 25 of substantial size on which a gear 26 to be tested may be mounted. A center 27 for engaging the opposite end of a shaft carrying such a gear, or of an arbor which may be seated in the spindle and on which the gear is mounted, is carried in alinement with the axis of the spindle by an arm 28 projecting from an upright bar 29 which is movable endwise in guides 30 and 31 of the base. The bar may be raised and lowered to accommodate shafts and arbors, or gear clusters, of different lengths by means of a hand wheel 32 on a shaft 33 carrying a pinion 34 in mesh with rack teeth 35 on the side of the bar, as best shown in Figs. 7 and 9. A key or pin 36 may be provided if necessary to supplement the rack teeth and pinion in maintaining true alinement of the center 27 with the spindle. A split collar 37 is secured to the top of the base at the upper end of the guideway 30, surrounding the bar 29, and is operated by a screw 38 to clamp the bar.

An arm 39, clamped and keyed to the spindle 21, carries a worm gear 40, with which a worm 41 meshes. Such worm is mounted on a shaft 42, rotatable in bearings 43 and 44 in the base, and of which the front end protrudes from the front wall of the base and carries a hand wheel 45. Such hand wheel and the worm and wheel gearing constitute means for rotating the spindle and thereby the gear being tested. It may be observed that the arbor 25 carries a dog 46 projecting into a recess in the gear for turning the latter when the spindle is turned; the dog in this instance being a pin carried by a collar 47 embracing and clamped to the arbor. This illustration typifies any means, of which other specific forms of device may be provided, for giving angular movement to the gear exactly equal to that which is imparted to the spindle.

A pointer or feeler 48 is provided to engage the side of the gear tooth being tested and to show by a multiplying indicator 49 any aberrations from true involute form which may exist in the tooth face so engaged. In the course of the test the engaging point of the feeler is moved in a straight line, tangent to the base circle of the gear, at the same linear speed as the base circle circumference, by the following mechanism.

The arm 39 carries rigidly secured to the upper side of its outer end a machine element 50, which may be considered as, and designated, a master tooth. The side faces of such master tooth are accurately formed involute of a large base circle, which may be called the master base circle, and the diameter of which is of definite predetermined magnitude. The master tooth is properly located in conformity with a location of the master base circle coaxial with the spindle. A slide 51 mounted to move endwise in the top of the base over the arm 39 carries, secured to its under side, abutments 52 and 53 embracing the master tooth 50. Each of these abutments may be considered as one side of a master rack tooth. Their position with respect to the angularity of their engaging surfaces is invariable, but the abutment 53 is adjustable perpendicularly to the path of movement of the slide to eliminate all backlash between the engaging master teeth. The engaging faces of the abutments are inclined equally and oppositely to lines perpendicular to the path of movement in order to distribute and reduce the wearing effect. These master tooth elements provide a rack and pinion couple of great accuracy by which the slide 51 is moved linearly in exact equality with the linear movement of the pitch circle circumference of gear element 50. Depending on the inclination of the abutment faces (their pressure angle), such pitch circle is in greater or less measure greater than the master base circle. With zero pressure angle the master base and pitch circles coincide; which is a feasible arrangement, but less satisfactory because contact is limited to a single point on each abutment.

A second slide 54, carrying the feeler and indicator, is mounted to travel in a path parallel to the path of slide 51, and in a manner such that it can be shifted without altering the parallelism between these paths. To distinguish these slides descriptively from one another, the first one may be called the drive slide and the second the indicator slide. The slides are coupled together for transmission of movement from one to the other by a lever 55, called the transmission or ratio lever, carried on the upper end of a shaft 56 which is mounted in bearings 57 and 58 in the machine base. A pin 59 projects upwardly from the end of the drive slide 51 into a slot 60 in the under side of this lever, and a pin 61 projects downwardly from the rearwardly offset extremity of the indicator slide 54 into a slot 62 in the upper side of the lever. The fulcrum axis of the lever is in the plane parallel to the paths of movement of the slides passing through the axis of the spindle; the contact point of feeler 48 and the center of pin 61 are positioned in a second plane parallel to the same paths; and the axis of pin 59 is in the operating pitch plane of the drive slide. This is the preferred arrangement but, as later appears, other possible arrangements are within the scope of the invention. The diameters of these pins (that is, of the parts which enter the slots 60 and 62), are equal to one another, the width of the slots 60 and 62 is equal to the diameter of the pins, and the walls of the slots are located so that they maintain the axes of pins 59 and 61 in the same plane with the axis of shaft 56, in all positions of the lever. These factors of equality and alinement are made as nearly exact and absolute as possible with precision methods of manufacture and adjustment. Hence it follows that the movement of the feeler is parallel and accurately proportional to the movement of the drive slide, and is equal to the linear movement of the base circle of a gear mounted concentrically on the arbor and of which the base circle radius is equal to the distance of the feeler point from the axis of the arbor. The slots 60 and 62 and the sliding engagement of the pins 59 and 61 in them enable the slides thus to move with true and accurate proportional motion notwithstanding the changing angularity of the lever 55. The slot 62 also permits adjustment of the feeler to gears of different diameters with corresponding change in the ratio of its movement to that of the drive slide.

To effect such adjustments, the indicator slide is mounted in an adjusting slide or carriage 63 which rests on the top of the base structure and is guided to move in a straight line transverse to the movement of the slides 51 and 54, by guides 64 and 65 secured to the base, which are embraced by rollers 66 on the slide or carriage (Fig. 4). This adjusting slide or carriage is long and wide, extending to both front and rear, and either side, of the spindle, and it is supported adjacent to its corners by two pairs of antifraction rolls 67 running on elevated trackways 68 on the base. One pair of such rolls is shown in Fig. 4, and by dotted lines in Fig. 3. The forward pair of like rolls is omitted from the latter figure, but Fig. 11 shows how they are intended to be mounted. An elongated opening 69 in the middle part of the adjusting slide through which the spindle 21 and the center-carrying bar 29 pass, permits a desired range of adjustment. Adjustment is effected by a screw 70, having a rotative bearing in a bracket 71 on the base, by which it is prevented from shifting endwise, engaging a nut 72 in the slide, and carrying a hand wheel 73 on its rear end by which it may be turned. Accurate placement of the feeler to accord with gears of different diameters may be effected with the aid of an index 74 (preferably of the type of the well known Zeiss microscope) and a scale 75. An alternative means for the same purpose consists of gauge blocks 76 placed on the base between an abutment 77 thereon and a seat 78 on the carriage. If the opposed faces of the abutment 77 and seat 78 are located to meet when the feeler is exactly in the axial line of the spindle, it is only necessary to interpose between these faces gauge blocks equal in length to the base circle radius of a given gear in order to set the feeler for testing that gear. The screw 70, when turned to bring the locating face 78 firmly against the gauge blocks, locks the adjusting slide in position. Likewise, and obviously, the index microscope 74 enables the feeler to be accurately placed.

The feeler 48 and indicator 49 are mounted on a holder 79 which is adjustable vertically on a guideway 80 which forms part of a bracket 81 secured to the indicator slide. The bracket is adjustable horizontally relatively to the slide in the direction of movement of the slide and is secured by a clamp screw 82 projecting through a slot 83 in the base of the bracket. Such horizontal adjustment enables the feeler, whenever it is adjusted toward or away from the spindle axis, to be maintained in the radial plane of the spindle which is perpendicular to the direction of the operating travel of the indicator, even though the arm 55 is inclined at such times. It also enables the feeler to be offset to one side or the other of such plane, if necessary, to accommodate gears of which the tooth root circumference is larger than the base circle. The vertical adjustment of the feeler accommodates gears which owing to their construction or fixed association with shafting or other gears, must be located at different levels.

The principle of a feeler operating an indicator to measure movements of the feeler on an enlarged scale is old, and I may use any of a variety of known mechanisms for that purpose, such, for instance, as the devices shown in my Patent No. 2,060,518, November 10, 1936. I make no claim to any novel invention in the indicator device used here, and have shown the same only in a diagrammatic manner. It may be assumed that the feeler is carried by one arm of a lever 84 which turns about a fulcrum 85 and has an arm 86 which bears on a plunger 87 projecting from the side of the indicator 49; and that the indicator contains multiplying leverage by which slight movements of the plunger are converted into movement through a wide arc of the indicating hand 88.

The slides 51 and 54 are supported so as to move freely but without backlash. Preferably they are so mounted by means of balls 89 arranged in rows along their opposite edges and loaded by pressure applied through the gibs 90. The shaft 56 is preferably supported by preloaded ballbearings in order to be free from looseness while easily movable.

In order to insure accurate alinement in the engagement of the drive and indicator slides with the transmission lever 55, while avoiding difficulty in assembling and adjusting closely fitting pins in rigid slots, I may use yieldable means for maintaining engagement of the pins 59 and 61 each with one wall of the slot containing it. In effect the wall 91 of slot 60 and the wall 92 of slot 62 are straight abutment faces, each parallel to the same radial plane of the lever at distances from that plane equal to the radii of the pins 59 and 60 respectively, and the opposite walls of the slots are means for maintaining the pins in contact with said abutments. Hence the axes of the pins are maintained in such radial plane, in all positions of the lever and in all adjustments of the indicator slide. The equivalent means of a yielding nature referred to may be of various sorts. Fig. 6 shows one illustrative embodiment of such means, in which the wall opposite to the alining edge 92 is a bar 93 movable toward and away from the wall 92 and pressed toward the latter by a spring 94 reacting against a seat 95 on the lever. Pins 96 in slots 97 in the bar limit the possible approach of the latter toward the wall 92 to a distance very slightly less than the diameter of the pin 61. A similar bar 98, similarly mounted, performs the same office with respect to the alining edge 91. Either wall of either slot may serve as the abutment and the other as the maintaining means. Other alternative yieldable means may be used for the same purpose within the scope of the invention.

The cylindrical pins here shown are a convenient means for maintaining the axis of the pivotal engagement between the slides and lever in a radial plane of the lever. But equivalents of known character may be used; such as anti-friction rollers suitably centered on the slides, or studs having a V edge arranged to engage abutment walls like those here shown but radially located on the lever. These and other equivalent variants of the specific pins shown are included within the scope and meaning of the term "pins" as used in the following claims.

Whatever the specific connections between the lever and slides may be, the lever is, in all its manifestations, a means for controlling the indicator so that the ratio of its movement to the movement of the drive slide is equal to the ratio of the base circle of the gear being measured to the master pitch circle. Thus the displacement of the feeler in a straight line is made equal to the linear movement of the base circle of the gear. The base circle radius of the gear to be tested being known, the feeler need only be set at a distance from the spindle axis equal to such radius, with the aid either of the index 74 and scale 75, or of the gauge blocks 76, in order to serve its purpose. Being then moved linearly, by the means described, while the spindle with a gear mounted on it is rotated, the feeler traces an involute curve in space with respect to the base circle of the gear. The gear teeth are placed, one after the other, in contact with the feeler prior to each such movement. If the tooth faces are perfect involutes, no movement of the feeler occurs other than that due to the slide on which it is mounted. But any errors of the tooth curvature cause incremental movements of the feeler, which are shown in true proportion by multiplied movement of the indicator pointer 88. To aid in showing where the errors are located on the tooth, and in making a record of them, the slide 51 carries a scale 99 adjacent to an index 100 mounted adjustably on the base. The graduations of this scale are spaced and numbered in terms of angular degrees on the master base circle.

The principle of the machine and the nature and range of possible adjustment to gears of different diameters, is shown in a simplified way by the diagrammatic view, Fig. 10. Here the correlating lever 55 is represented as having the slot 62 in its upper side extended throughout its entire length, and its length as being great enough to permit placement of the indicator slide 54 to measure a gear somewhat larger than the master base circle. From this outside limit, the indicator slide may be brought to a position where the feeler point is in the spindle axis, or at any intermediate point. The circular line $a$ in this figure represents the master base circle with respect to which the involute curves $b$ of the master tooth 50 are generated. The broken line $d$ represents the pitch circle on which the master tooth operates with the rack tooth abutments of the drive slide, this being of different diameter than the matser base circle due to the inclination of the faces of these abutments. The broken straight line *e—f* represents the operating pitch line of the rack. The line *g—h* represents the travel of the feeler when measuring a gear having a base circle of the same diameter as the master base circle, and the line *j—k* represents the path of the feeler when measuring a small gear having the base circle *a'*. In principle there is no limit to the range of adjustment permitted by correlating means of this character, and it may be extended to measure gears larger than the master base circle. But in practice it is preferred to keep the range of measurable gears within the diameter of the master base circle; or, in other words, to make the master base circle larger than the largest gear measurable within the physical limits of adjustment of a given machine. This has the advantage of dividing, at the measuring point, such inaccuracies of movement as may result from the impossibility of obtaining absolute perfection in mechanical constructions. In the illustrated machine the limits of adjusting movement of the carriage 63 are such that that the range of measurable gears is from zero base circle diameter to a maximum of about one third of the master base circle diameter. But it will be readily apparent to those skilled in the art that, by increasing the front to rear dimensions of the base, the carriage, and the adjusting means, the adjustment range may be increased to any desired practicable limit.

The foregoing description of the relationship between the axes of the test gear and ratio lever, between the feeler point and the axis on which the indicator slide and the ratio lever are connected, and that between the operating pitch line and the axis on which the drive slide and the ratio lever are connected, sets forth the preferred and simplest construction. But this specific relationship is not a limiting factor of the invention, and other positions of the lever and of the points through which it engages the slides are possible. For instance, the fulcrum axis of the lever may be placed at any point on either side of the plane passing through the work holder axis parallel to the paths of the slides, provided the pivot center of the connection 59 between the drive slide and the lever is equally displaced in the same direction from the parallel plane tangent to the master pitch circle, and the center of the pivot pin 61 is equally displaced in the same direction from a parallel plane including the feeler point, without changing in the slightest the character or accuracy of the movement imparted to the feeler when the machine is operated in the manner described. This is true whether the effective arms of the ratio lever are on the same or opposite sides of the fulcrum. Provided all of the pivot points are displaced equally in the same direction relatively to the planes referred to, the ratios between the movements of the two slides have the values precedently described. In any case, the pivot axes of connections between the two slides and the lever travel in parallel planes, which include or are parallel to the paths of the slides themselves, and the ratio between the distances by which these planes are respectively separated from a third parallel plane passing through the fulcrum axis of the lever is equal to the ratio between the master pitch cicle and the base circle of the test gear, when the feeler is adjusted to that base circle. In the first described case these planes are respectively tangent to the master pitch circle and coincident with the path of the feeler point, while in other cases they are parallel to such tangent plane and path respectively.

The machine thus far described contains what is essentially a rack and gear couple for transmitting movement from the rotatable spindle to the drive slide. A variant of the invention, shown in Figs. 11, 12, 13 and 14, substitutes alternative equivalent means for the same purpose, consisting of flexible tapes. In place of the arm 39 and master involute 50, the spindle 21 carries a master disk 101 connected with the drive slide 51a by tapes 102 and 103. The tape 102 is wrapped partly around the circumference of the disk and connected to it at one end by an anchorage screw 104 while its opposite end is connected to the slide by a screw 105. Tape 103 is connected to the disk and slide by screws 106 and 107, and extends in the opposite direction from tape 102. These tapes are thin, flexible and, as far as possible, non-stretchable; being made of steel or other suitable alloy or material. Provision is made for adjusting the tension of the tapes by means of an adjusting slide 108, mounted in a guideway in the drive slide, in which the anchorage screw 107 for tape 103 is seated, and with which an adjusting screw 109 and clamp screw 110 are associated, as shown in Fig. 14. The manner in which this take up means may be adjusted to tighten or relax the tapes will be obvious from the drawings.

A hand wheel 45 like that previously described is geared to the drive slide through rack teeth 111 on the latter and a pinion 112 meshing with such teeth and carried by a shaft 113 on which the hand wheel is mounted. This mechanism is the reversed equivalent of the one first described, in that force applied initially to the slide is transmitted to the spindle. The tapes are a well known means, equivalent to toothed gearing, for transmitting equal linear movement between translative and rotative elements. In this case the circumference containing the neutral line of the tapes is the master pitch circle.

Wires may be substituted for the flat ribbon-like tapes here shown, and are equivalent thereto. Indeed a wire is essentially a species of tape. For the purpose of generic definition in this case, the term "tape" is to be understood as embracing wire and other equivalent species.

The drive slide 51a is coupled with the indicator slide 54 by a correlating lever 55 and pins 59 and 61, or equivalent means essentially like those previously described.

For the rest, the machine illustrated in Figs. 11–14 is essentially like that shown in Figs. 1–10 inclusive except for the omission of the vertically movable bar carrying an upper center and the means for adjusting it. These figures likewise show an alternative form of arbor 114 constructed to receive and clamp a gear cluster such as is used in automobile transmissions; such arbor being of a character which requires no supplementary center to locate its upper end. But obviously this machine may be provided with such an upper center and means for holding it like that of the machine first described. Fig. 11 shows also a reversal of the index and scale by which the angular movement of the spindle is measured; the scale 99a in this case being fixed to the machine base and the index 100a being carried by the drive slide.

The third embodiment of the invention, which is shown in Figs. 15, 16, 17 and 18, contains means for imparting both linear and rotational components of motion to the drive slide and feeler. The spindle 21a supporting the gear to be tested (by means of an arbor 114 or its equivalent) is fixed in a socket 115 in the base by the clamping agency of a shoulder 116 and a nut 117. The drive slide 118 and the adjusting slide or carriage 63a, carrying the indicator slide 54, are supported on a table 119 which rests on the top of the base. The table has bearings 120 surrounding, and centering it on, the spindle, and a cylindrical rib 121 concentric therewith resting on a bearing surface 122. An internal gear segment 123 is secured on the inner wall of the rib 121 and meshes with a pinion 124 on an upright shaft 125 which is rotated by hand wheel 45 through a shaft 126 and a pinion and crown gear couple 127, 128. A master tooth 50a, the faces of which are involutes of a large master base circle a, is fixed rigidly on the base structure in a plane parallel to the swinging table and in a location such that its base circle is concentric with the spindle axis. The drive slide 118 carries abutments 52a, 52b, corresponding to rack tooth faces flanking the master tooth, which are held in contact with the master tooth by rollers 129 bearing against the outer side of the slide and rotatable on studs 130 which are mounted in the swinging table, and are preferably so mounted as to be adjustable therein about axes eccentric to those of the rollers. By this means the abutments are caused to bear firmly and without backlash on the master tooth and the slide is rocked when the table is rotated and its linear movement relatively to the table is caused to take place in a path parallel to the path of the indicator slide. In the efficient utilization of available space, the drive slide is located at the opposite side of the axis from the indicator slide. This, however, is not an essential or limiting feature of the species of the invention now being described. Neither is the location of both slides at the same side of the axis a limiting feature of the previously described species; for in these machines also the slides could be on opposite sides, substantially as here shown.

A lever 55a, which is substantially like lever 55 except that its arms are on relatively opposite sides of its fulcrum shaft 56a, to correspond with the opposition of the slides, is coupled with the drive slide by a pin and slot connection 50a, 60a, and with the indicator slide by a pin and slot combination 61a, 62a. Here also the pin and fulcrum axes have the same relative alinements with one another, as previously described, and are similarly related to the master pitch circle and the paths of relative movement between the slides and the table, as indicated by the lines e—f and g—h corresponding to the lines similarly designated in Fig. 10. And, also as previously described, like results are obtained if the fulcrum is placed away from the plane through the work holder axis parallel to these lines, provided the pivot connections 59a and 61a are displaced equally, and in the same direction, from the planes designated by the lines e—f and g—h. The indicator slide, feeler and carriage for adjusting them to gears of different diameters are essentially like those of the machine embodiments previously described, with the exception only that the abutments for the adjusting screw and for the gauge blocks, as also the scale 75, are mounted on the swinging table instead of on the base.

It will be at once apparent that in testing the right hand face, for instance, of a gear tooth in front of the spindle axis, the hand wheel 45 is turned so as to swing the table in clockwise rotation. This causes the drive slide to be rocked angularly on its points of engagement with the master tooth; but, as it is prevented by the latter from revolving with the table around the axis of the spindle, a relative motion occurs which is the same as though the slide were moved to the left from the position shown in Fig. 15 by rotation of the master tooth counterclockwise, with the table remaining stationary. This moves the indicator slide in the opposite direction relatively to the table, thus withholding the feeler from rotating in a path concentric with the spindle axis, and giving it a resultant movement in a path which is the involute of the base circle of the gear to which the feeler has been adjusted. If the gear tooth beside which the feeler thus moves is a true involute, no other movement of the feeler occurs. But if it is incorrect, the feeler is given an incremental movement, which is shown on an enlarged scale by the indicator.

The herein illustrated embodiments of the invention utilize two of the three methods of generating or tracing involute curves in space, namely, that of rotating the base circle while translating the tracing point at equal linear speed in a line tangent to the base circle, and that of simultaneously imparting rotation and translation to the tracing point. The means for carrying out both methods according to this invention are generically alike in that they include a drive slide, an indicator slide carrying the tracing point, a ratio lever correlating the distances of relative movement of the two slides, adjusting means to alter the ratio of the effective arms of such lever, and means for effecting relative rotation between the holder for the gear being tested and the holder for the parts by which the tracing point is controlled. In this generic analysis, the point on the feeler which engages the tooth being tested is the tracing point; the spindle 21 or 21a and associated arbor (and co-operating center where used) is the holder for the gear being tested; and the machine base in the forms of machine shown in Figs. 1-4 inclusive is the holder for the tracing point and its controlling mechanism, including both slides and the ratio lever, while in the machine of Figs. 15-18 the swinging table 119 constitutes the corresponding holder. In each embodiment a gear couple originates the relative translative movement of the tracing point in consequence of relative rotation between the respective holders. The gear couple in the first and third embodiments described is composed of a master tooth and parts of two conjugate master rack teeth, and in the second described embodiment it is a disk maintained in non-slipping tangent power transmitting connection with the slide by tapes. In all three embodiments one element of the gear couple is non-rotatable relatively to the gear holder, while relative rotation is effected between the gear holder and the tracing point holder.

The foregoing description is not intended to limit the scope of the invention to the use of testing involute forms only. Actually the machine, in any of the embodiments described and implied by this specification, is usable without change for testing, measuring and charting other types of gear teeth and curves. In such uses the feeler is displaced when traversing the curve, whether such curve is accurate or inaccurate. But if the displacement of the feeler at definite angles in the relative rotation of the true curve are known, then differences of feeler displacements at the same points in the form being tested show the character and amount of errors in the latter.

By charting the departures from involute curvature of a non-involute master gear, for instance, a standard of comparison is furnished for all other gears which should be like the master.

What I claim and desire to secure by Letters Patent is:

1. A machine for testing faces of gear teeth and the like comprising a spindle adapted to hold a gear to be tested, a slide holder, a drive slide mounted to reciprocate in a given path in said holder, the spindle and slide holder being relatively rotatable one with respect to the other, and the drive slide and spindle being geared together so as to effect movement of the slide relatively to the holder in equality with the peripheral arc of a master pitch circle coaxial with the axis of such relative rotation, an indicator slide mounted on said holder and guided to move in a path parallel to the path of the drive slide, a lever pivoted to said holder with its fulcrum axis parallel to the first-named axis, a feeler carried by the indicator slide for engagement with the form to be tested, and pivotal connections between said lever and the respective slides consisting of pins on the slides and slots in the lever containing said pins; the axes of said pivotal connections and the fulcrum axis of the lever being in the same plane, and also in planes parallel to the paths of movement of the slides, the normal distances between which planes are equal to the radii of the master pitch circle and of the base circle of the test gear.

2. A testing machine as set forth in claim 1 and including means for shifting the indicator slide bodily toward and away from said axis of relative rotation while maintaining its path of movement parallel at all times with the path of the drive slide.

3. An involute testing machine comprising a base, a spindle rotatable on said base, a master tooth element secured to said spindle, a drive slide guided to travel on the base in a straight line and having a master rack tooth form engaging said master tooth, a carriage mounted on the base and guided for movement thereon in a path transverse to said drive slide, an indicator slide mounted on said carriage with provision for movement in a path parallel to that of the drive slide, a feeler secured to said indicator slide for engagement with involute forms mounted on said spindle, and proportional motion mechanism between the slides organized to cause movement of the indicator slide to occur in a ratio to the movement of the drive slide which is equal to the ratio of the base circle of the form being tested to the operating pitch circle of the master tooth.

4. An involute testing machine as set forth in claim 3, in which the proportional motion mechanism consists of a lever pivoted in a plane which passes through the spindle axis parallel to the paths of said slides and has an alining abutment making contact with the indicator slide through an axis in a plane which includes the feeler and is parallel to the before named plane, and making contact with the drive slide through an axis in a third parallel plane which is tangent to the master pitch circle.

5. An involute testing machine comprising a rotatable spindle adapted to hold and rotate an involute form with the base circle of such form centered on the axis of the spindle, a base supporting said spindle rotatably, a slide guided to move on the base in a straight line and geared to the spindle to move equally to the linear movement of a master pitch circle coaxial and rigidly connected with the spindle, when the spindle is rotated, a carriage on the base adjustable in a guided path transverse to the movement of said slide, a slide on said carriage guided to move relatively thereto in a path parallel to that of the first named slide, a lever pivoted to swing on the base about an axis which lies in a plane through the axis of the spindle parallel to the paths of said slides, both slides having pins and the lever having abutments engaging both pins and maintaining the axes of said pins in the same plane with the axis of the lever, and a feeler carried by the second named slide; the axis of the pin on the first named slide being in a plane tangent to the master pitch circle and parallel with the path of movement of the slide, and the axis of the pin on the second named slide being in a plane through the contact point of said feeler parallel to the path of movement of the slide.

6. An involute testing machine as set forth in claim 5 combined with means for locating the carriage in different positions such that the line of movement of the feeler is tangent to the base circles of different involute elements to be tested when such elements are centered on the spindle.

7. An involute gear testing machine comprising a base, a spindle rotatable in said base adapted to carry in coaxial position a gear to be tested, a master disk, connected and rotatable with the spindle, a slide guided on the base to travel in a straight line, flexible tapes passing from separated points of connection with the slide in relatively opposite directions between the slide and disc and around arcs of the circumference thereof to points of anchorage with the disk, said slide, tapes and disk being in tangent contact with one another, whereby the movements of the slide are caused to be equal to the linear movements of the neutral line of the tapes when the spindle is rotated, and vice versa, a carriage mounted on the base and guided to move in a fixed path transverse to the path of said slide, a slide on said carriage guided to move in a path parallel to that of the first slide, a feeler carried by the second slide and being movable by said carriage to positions where its different paths of movement are tangent to the base circles of different gears, and means for transmitting movement from the first slide to the second slide in any position of the latter at a speed ratio which is equal to the ratio of the master pitch circle to the base circle of the gear fixed to the spindle when the feeler is brought into tangent relationship to the base circle of such gear.

8. A gear testing machine as set forth in claim 7, in which the movement transmitting means is a lever pivoted to the base and having pin and slot connection with the two slides at points such that the ratio of the effective lever arms is equal to the ratio of the master pitch circle to the base circle of the gear being tested.

9. An involute testing machine comprising a base having stationary means for supporting a gear to be tested, a table supported on said base and guided to rotate around the axis of the test gear location, a slide relatively movable in a fixed path on said table, a master tooth fixed to the base and having faces which are involute curves of a master base circle coaxial with the test gear, the slide having abutments corresponding to master rack teeth engaging opposite sides of said master tooth, a second slide movably mounted on said table to travel in a path parallel to that of the first slide, a feeler carried by the second slide adapted to engage the tooth faces of test gears, means for adjusting the second slide to bring the path of movement of the feeler into tangency with the base circles of different test gears, and transmission machanism by which movements of the second slide relatively to the table are controlled by the first slide to take place at a ratio to the movement of the first slide which is equal to the ratio between the master pitch circle and the base circle of the gear being tested when the feeler is in the before described tangential relationship to the latter base circle.

10. A gear testing machine comprising a stationary holder adapted to support a gear to be tested, a holder angularly movable about the gear holder on an axis coinciding with that of the test gear, two slides mounted on the second holder with provision for linear movement in paths parallel to each other, a ratio lever pivoted to the second holder and having a slip connection with each slide, means affording adjustment for one of said slides to change the effective length of the lever arm with which it is so engaged, a feeler carried by the last named slide, a master gear tooth form in fixed relation to the stationary holder, and rack tooth elements mounted on the other slide embracing said master gear element to effect geared connection with the stationary holder.

11. A gear testing apparatus comprising a holder adapted to support gears to be tested of different base circle diameters, a master gear element connected in relatively non-rotatable association with said gear holder, a slide in nonslip pitch line tangency with said master gear element, a holder for said slide, the slide holder and slide on the one hand and gear holder and master gear element on the other hand being relatively rotatable with respect to one another about the pitch circle axis of the master gear element, a second slide carried by the slide holder and being movable relatively thereto in directions both parallel and transverse to the path of movement of the first slide, a feeler carried by said second slide, and a lever pivoted to the slide support and having arms with straight edged abutments and means for maintaining contact points on the slides in slip contact engagement with said abutments.

12. A gear testing machine comprising a rotatable holder adapted to support a gear to be tested, a stationary holder, two slides mounted on the second holder with provision for linear movement in paths parallel to each other, a ratio lever pivoted to the second holder having slip connections with both slides, means affording adjustments for one of said slides to change the effective length of the lever arm between its slip connection and the fulcrum axis of the lever, and a feeler carried by the last named slide, the other slide being in geared connection with the first-named holder.

13. An apparatus for testing involute curves comprising a holder for the element to be tested, a tracing point or feeler, a slide carrying said feeler, a slide holder on which said slide is mounted with provision for linear movement in a prescribed path, means for effecting relative rotation between said holders around the base circle axis of the element to be tested, a main slide movable on the slide holder in a path parallel to that of the feeler-carrying slide, means comprising a master tooth form in fixed angular relationship to said test element holder and an abutment on said main slide engaging a side of said form by which relative rotation movement between the said holders causes movement of said main slide relatively to the slide holder, a lever engaged with both slides for causing the movement of the indicator slide to occur at a prescribed ratio to the movement of the drive slide, and means affording adjustment of said indicator slide toward and away from the said base circle axis and adjustment simultaneously of its engagement with the ratio lever toward and away from the fulcrum of the lever.

14. In a testing apparatus of the character set forth, a holder for the element to be tested, a slide holder, said holders being rotatable one relatively to the other about a given axis, a drive slide and an indicator slide supported on said slide holder with provision for linear movement relatively to said holder in parallel paths tangent to circles concentric with said axis, means for causing such movement of the drive slide simultaneously with relative rotation between the holders, a lever having radial slots in its upper and lower sides respectively for moving the indicator slide simultaneously with the drive slide, said slides each having a pin, one pin fitting in one of said slots and the other pin in the other slot, a feeler carried by said indicator slide for engagement with a gear tooth form mounted coaxially with the before named axis, and means for shifting said indicator slide and feeler toward and away from said axis.

15. A machine for testing generated forms comprising a spindle adapted to support a form to be tested with the axis of its base circle in a given location, a slide holder, a drive slide and an indicator slide mounted for movement on said holder in parallel paths, a feeler carried by said indicator slide adapted to engage the form to be tested, said spindle and holder being relatively rotatable, one with respect to the other, around said axis, a lever mounted on said holder having alining edged parallel to a line through the fulcrum of the lever transverse to the slides for abutting engagement with both slides, the slides having abutment elements in engagement with said edges and the lever having cooperating means for maintaining said elements and edges in firm abutting contact in all positions within an operative range of movement, and means affording adjustment of the indicator slide to alter the distance of the feeler from the said axis and of the point of engagement between the indicator slide and lever from the fulcrum of the lever simultaneously.

EDWARD W. MILLER.